US010920850B2

(12) United States Patent
Kato et al.

(10) Patent No.: US 10,920,850 B2
(45) Date of Patent: Feb. 16, 2021

(54) CONNECTOR

(71) Applicant: NICHIAS CORPORATION, Tokyo (JP)

(72) Inventors: Tadakatsu Kato, Tokyo (JP); Ichiro Raita, Tokyo (JP); Keiichi Yoshino, Tokyo (JP); Koki Enami, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 399 days.

(21) Appl. No.: 15/747,563

(22) PCT Filed: Oct. 7, 2016

(86) PCT No.: PCT/JP2016/079903
§ 371 (c)(1),
(2) Date: Jan. 25, 2018

(87) PCT Pub. No.: WO2017/061587
PCT Pub. Date: Apr. 13, 2017

(65) Prior Publication Data
US 2018/0245614 A1 Aug. 30, 2018

(30) Foreign Application Priority Data
Oct. 9, 2015 (JP) ................................. 2015-200723

(51) Int. Cl.
F16F 15/06 (2006.01)
F16F 15/04 (2006.01)
(Continued)

(52) U.S. Cl.
CPC .......... F16F 15/046 (2013.01); F01N 13/102 (2013.01); F01N 13/14 (2013.01);
(Continued)

(58) Field of Classification Search
CPC .......... F02B 77/11; F02B 77/13; F01N 13/14; F01N 13/102; F01N 2510/02; F01N 2510/04; F16F 15/046; F16F 15/06
See application file for complete search history.

(56) References Cited

U.S. PATENT DOCUMENTS 4,341,187 A 7/1982 Absenger
6,328,513 B1 12/2001 Niwa et al.
(Continued)

FOREIGN PATENT DOCUMENTS

JP H1150842 A 2/1999
JP 2004-116442 A 4/2004
(Continued)

OTHER PUBLICATIONS

International Search Report dated Dec. 6, 2016, issued in counterpart International Application No. PCT/JP2016/079903 (2 pages).
(Continued)

Primary Examiner — Michael P Ferguson
(74) Attorney, Agent, or Firm — Westerman, Hattori, Daniels & Adrian, LLP

(57) ABSTRACT

Provided is a connector including: a first buffer member including a spiral-shaped wire; a second buffer member that has a substantially annular and flat plate-like shape; a collar member that includes a cylindrical portion surrounded by the first buffer member and the second buffer member, a first flange facing a radially inner side of the first buffer member, and a second flange facing a radially inner side of the second buffer member; and a coupling member that includes a first holder section holding radially outer sides of the first buffer member and the second buffer member, a second holder section holding the shielding body, and a coupling member base portion, in which a gap is formed between the second buffer member and the cylindrical portion, and the radially inner sides of the first buffer member and the second buffer (Continued)

member are sandwiched by the first flange and the second flange.

4 Claims, 9 Drawing Sheets

(51) Int. Cl.
| | |
|---|---|
| *F02B 77/13* | (2006.01) |
| *F16F 3/02* | (2006.01) |
| *F02B 77/11* | (2006.01) |
| *F16F 1/10* | (2006.01) |
| *F01N 13/14* | (2010.01) |
| *F01N 13/18* | (2010.01) |
| *F16F 1/18* | (2006.01) |
| *F16B 5/02* | (2006.01) |
| *F01N 13/10* | (2010.01) |

(52) U.S. Cl.
CPC ...... *F01N 13/1811* (2013.01); *F01N 13/1855* (2013.01); *F02B 77/11* (2013.01); *F02B 77/13* (2013.01); *F16B 5/02* (2013.01); *F16B 5/0241* (2013.01); *F16F 1/10* (2013.01); *F16F 1/18* (2013.01); *F16F 3/02* (2013.01); *F16F 15/06* (2013.01); *F01N 2260/20* (2013.01); *F16F 2224/0208* (2013.01)

(56) References Cited

U.S. PATENT DOCUMENTS

| | | | | |
|---|---|---|---|---|
| 7,065,963 B2* | 6/2006 | Niwa | ......... | B60R 13/0876 165/72 |
| 7,155,903 B2* | 1/2007 | Ishiwa | ......... | F01N 13/102 267/160 |
| 7,273,128 B2* | 9/2007 | Niwa | ......... | B60R 13/0876 181/207 |
| 7,284,748 B2* | 10/2007 | Mishima | ......... | F02B 77/11 267/140.11 |
| 8,899,376 B2* | 12/2014 | Akimoto | ......... | F16F 1/125 181/209 |
| 9,964,175 B2 | 5/2018 | Herald et al. | | |

FOREIGN PATENT DOCUMENTS

| | | | |
|---|---|---|---|
| JP | 2004-360496 A | 12/2004 | |
| JP | 2005-30570 A | 2/2005 | |
| JP | 2005-233039 A | 9/2005 | |
| JP | 2011-64194 A | 3/2011 | |
| KR | 10-1892413 B1 | 8/2018 | |
| WO | WO 2006/128676 * | 12/2006 | ............... F01N 7/10 |
| WO | 2011021495 A1 | 2/2011 | |

OTHER PUBLICATIONS

Written Opinion of International Searching Authority dated Dec. 6, 2016, issued in counterpart International Application No. PCT/JP2016/079903 (3 pages).
Office Action dated Feb. 1, 2019, issued in Korean Application No. 10- 2018-7007631 (counterpart to U.S. Appl. No. 15/765,552), with English translation. (7 pages).
Office Action dated Mar. 4, 2019, issued in CN Application No. 201680059013.3 (counterpart to U.S. Appl. No. 15/765,552), with English translation. (39 pages).
Office Action dated Apr. 16, 2019, issued in JP Application No. 2017-544237 (counterpart to U.S. Appl. No. 15/765,552), with English translation. (9 pages).
Office Action dated Aug. 21, 2018, issued in counterpart Chinese application No. 201680046778.3, with English translation. (23 pages).
Office Action dated Mar. 1, 2018, issued in counterpart Korean Application No. 10-2017-7036907, with English translation. (18 pages).
Office Action dated Feb. 19, 2020, issued in ID Application No. P00201803340 (counterpart to U.S. Appl. No. 15/765,552: with English Translation. (4 pages).
Office Action dated Feb. 19, 2020, issued in counterpart ID Application No. P00201801986, with English Translation. (4 pages).
Office Action dated Oct. 22, 2020, issued in co-pending U.S. Appl. No. 15/765,552 (29 pages, w/Form PTO-892 and returned PTO/SB/08a).

* cited by examiner

CONNECTOR

TECHNICAL FIELD

The present invention relates to a connector that is provided to a connection between a vibrating body and a plate-like shielding body attached to the vibrating body.

BACKGROUND ART

Engines, transmissions, exhaust manifolds attached to engines, turbochargers, heat-exchanging components, and electrical rotating machines are vibrating bodies that themselves vibrate, or that are vibrated by being affected by engines. Various components are attached to such a vibrating body. One example of such attached components is a shielding body such as an exhaust manifold cover or a heat insulator.

Such a shielding body generally includes two metal sheets facing each other, and is configured to prevent physical energies such as heat and sound emitted from the vibrating body from being transmitted to other components near the engine or the outside of the vehicle. When the shielding body is vibrated by the vibrating body, either directly or indirectly, the shielding body may be damaged or generate unusual sound.

To avoid the effects of such vibrations, connectors have been conventionally developed for providing a vibration isolating structure to a connection between the vibrating body and the shielding body.

Patent Document 1, for example, discloses a connector in which a buffer member including a spiral-shaped wire is interposed between a collar member and a member to be connected.

RELATED-ART DOCUMENT

Patent Document

Patent Document 1: Japanese Patent Publication 2011-64194-A

SUMMARY OF THE INVENTION

Technical Problem

There are some possible problems in Cited Document 1. For example, after an extended use, a middle portion of the spiral-shaped wire serving as a buffer member may protrude in the axial direction, and the middle portion may be held in a manner bridging over the collar member or a coupling member. As a result, the connector becomes incapable of achieving the vibration isolation having been originally intended. As another example, an extended use may cause a deformation of the buffer member, and bring a shielding body or the coupling member into contact with a vibration source. As a result, components may be damaged, or unusual sound may be generated.

Therefore, an object of the present invention is to provide a connector in which a buffer member including a spiral-shaped wire deforms less in the course use, and no middle portion of the wire protrudes to the outside.

Solution to Problem

The present inventions described below solve the problems described above.

In other words, the present invention (1) provides a connector that is provided to a connection between a vibrating body that is a vibration source and a plate-like shielding body that is attached to the vibrating body, the connector including:

a first buffer member that includes a spiral-shaped wire in a plan view;

a second buffer member that has a substantially annular and flat plate-like shape, that is capable of warping in a thickness direction, that is stacked with the first buffer member;

a collar member that includes a cylindrical portion having an insertion hole for a fixing member for attaching the connector to the vibrating body, the cylindrical portion surrounded by the first buffer member and the second buffer member, a first flange facing a radially inner side of the first buffer member, and a second flange facing a radially inner side of the second buffer member, the first and the second flanges both protruding from the cylindrical portion in a radial direction, and a coupling member that includes a first holder section holding radially outer sides of the first buffer member and the second buffer member, a second holder section holding the shielding body, and a coupling member base portion connecting the first holder section and the second holder section, in which a gap for allowing the second buffer member to move in the radial direction is formed between the second buffer member and the cylindrical portion, and the radially inner sides of the first buffer member and the second buffer member are sandwiched by the first flange and the second flange in such a manner that the second buffer member is movable in the radial direction.

Furthermore, the present invention (2) provides a connector that is provided to a connection between a vibrating body that is a vibration source and a plate-like shielding body that is attached to the vibrating body, the connector comprising:

a first buffer member that includes a spiral-shaped wire in a plan view;

a second buffer member that has a substantially annular and flat plate-like shape, that is capable of warping in a thickness direction, and that is stacked with the first buffer member;

a third buffer member that includes a spiral-shaped wire in a plan view, and that is stacked with the second buffer member on a side opposite to the first buffer member;

a collar member that includes a cylindrical portion having an insertion hole for a fixing member for attaching the connector to the vibrating body, the cylindrical portion surrounded by the first buffer member, the second buffer member, and the third buffer member, a first flange facing a radially inner side of the first buffer member, and a second flange facing a radially inner side of the third buffer member, the first and the second flanges both protruding in a radial direction, and a coupling member that includes a first holder section holding radially outer sides of the first buffer member, the second buffer member, and the third buffer member, a second holder section holding the shielding body, and a coupling member base portion connecting the first holder section and the second holder section, in which a gap for allowing the second buffer member to move in the radial direction is formed between the second buffer member and the cylindrical portion, and the radially inner sides of the first buffer member, the second buffer member, and the third buffer member are sandwiched by the first flange and the second flange in such a manner that the second buffer member is movable in the radial direction.

Advantageous Effects of the Invention

According to the present invention, it is possible to provide a connector in which a buffer member including a spiral-shaped wire deforms less in the course of use, and no middle portion of the wire protrudes to the outside.

DESCRIPTION OF EMBODIMENTS

Figure 1:
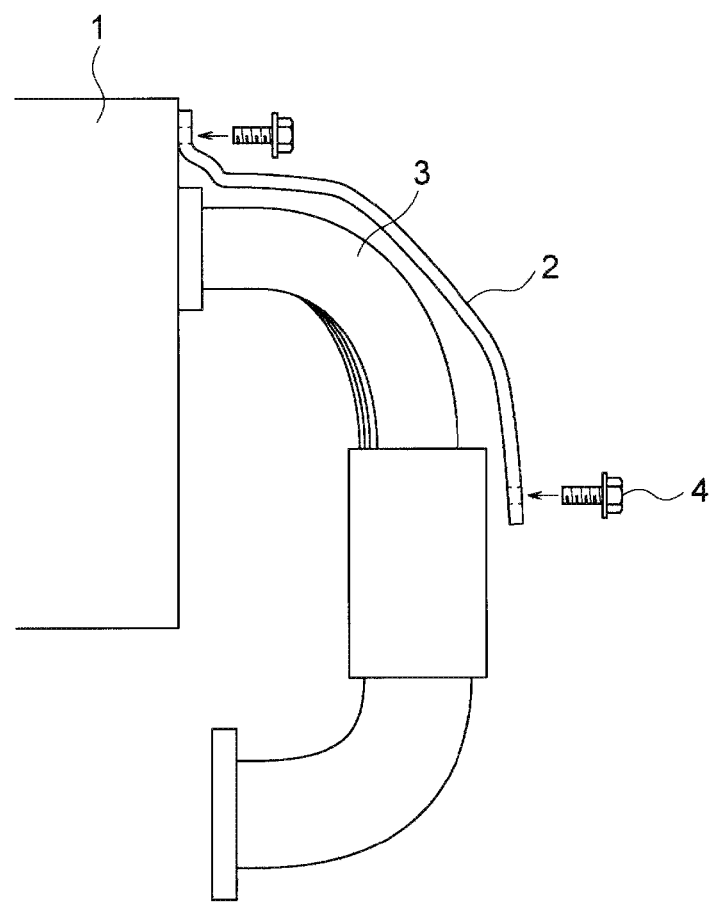
FIG. 1 is a schematic illustrating an engine, an exhaust manifold, and a shielding body for which a connector according to the present invention is used.
Figure 2:
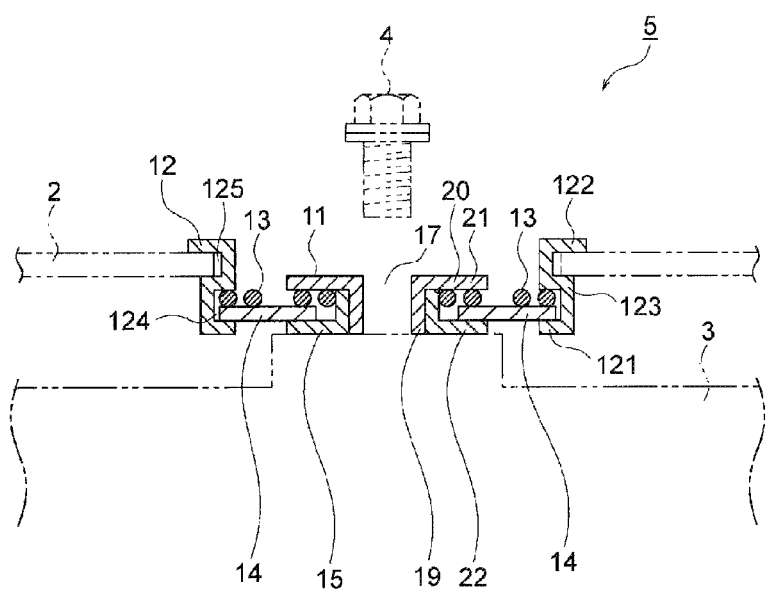
FIG. 2 is an end view schematically illustrating how the vibrating body is connected to the shielding body using a connector according to an exemplary embodiment of the present invention.
Figure 3:
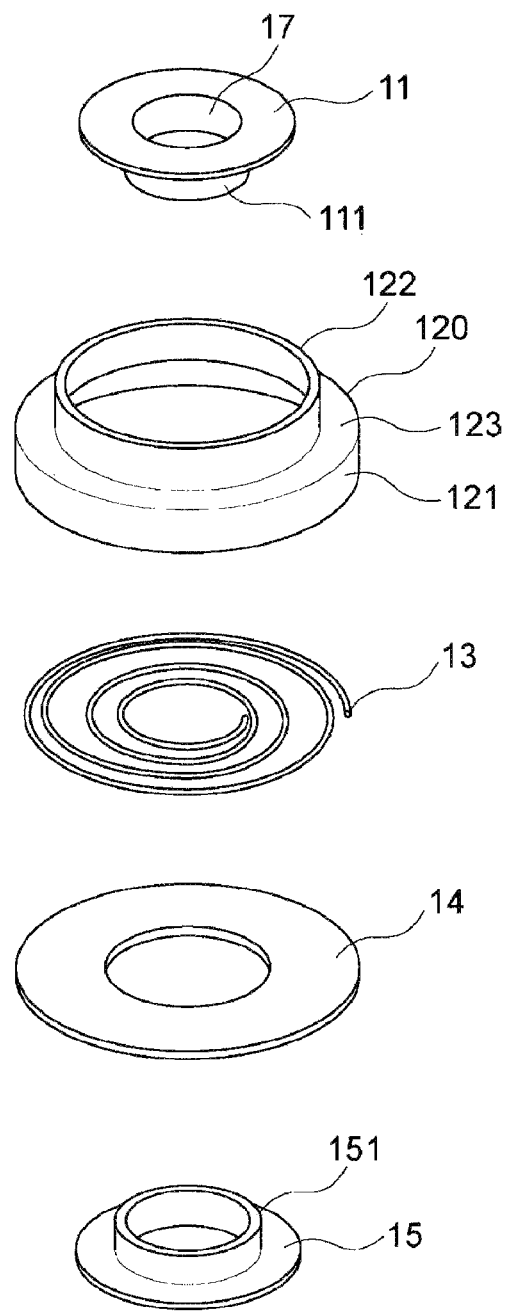
FIG. 3 is a perspective view illustrating members with which a connector 5 illustrated in FIG. 2 is manufactured.
Figure 4:
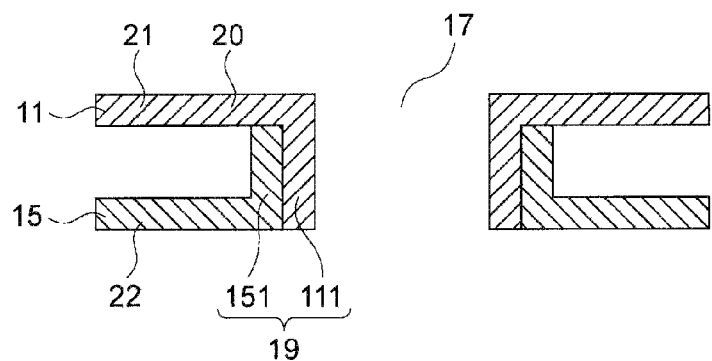
FIG. 4 is an end view illustrating the collar member in FIG. 3.
Figure 5A:
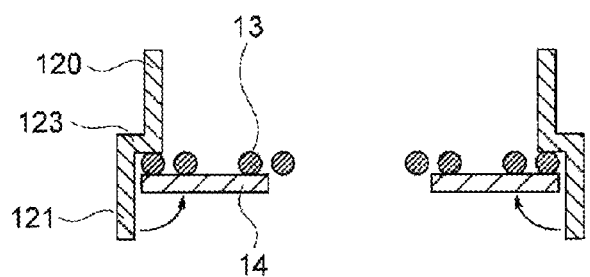
FIGS. 5(A)-5(B) are end views illustrating how holder sections are formed on a coupling member 120 on which no holder section has been formed.
Figure 5B:
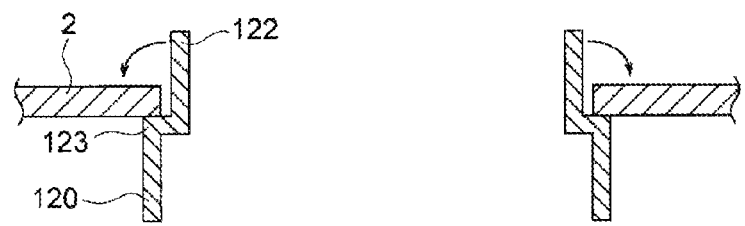
Figure 6:
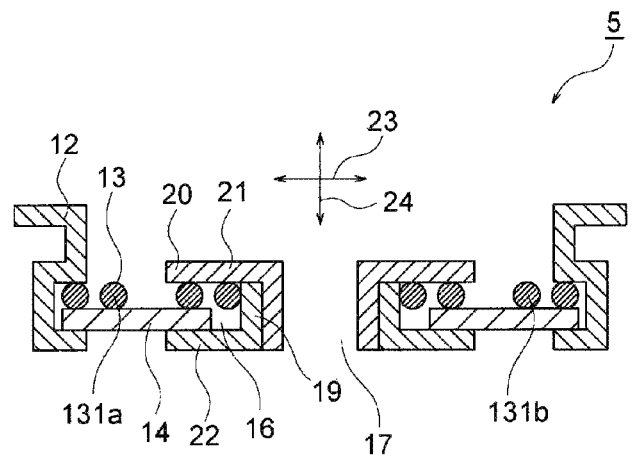
FIG. 6 is an end view illustrating the connector 5 in FIG. 2.
Figure 7A:
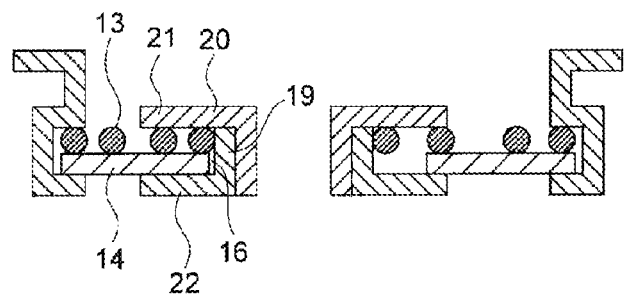
FIGS. 7(A)-7(B) are schematics illustrating how the buffer member in FIG. 2 is moved in a radial direction by vibrations.
Figure 7B:
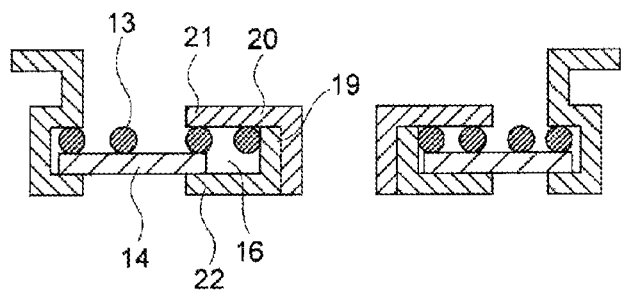

A connector according to the present invention will now be explained with reference to FIGS. 1 to 7. FIG. 1 is a schematic illustrating an engine, an exhaust manifold, and a shielding body for which a connector according to the present invention is used. FIG. 2 is an end view schematically illustrating how the vibrating body is connected to the shielding body using a connector according to an exemplary embodiment of the present invention. FIG. 3 is a perspective view illustrating members with which a connector 5 illustrated in FIG. 2 is manufactured. FIG. 4 is an end view illustrating the collar member in FIG. 3. FIG. 5 is an end view illustrating how holder sections are formed on a coupling member 120 on which no holder section has been formed. FIG. 5(A) is a schematic illustrating how a first holder section is formed, and FIG. 5(B) is a schematic illustrating how a second holder section is formed. FIG. 6 is an end view illustrating the connector 5 in FIG. 2. FIG. 7 is a schematic illustrating how a buffer member in FIG. 2 is moved in a radial direction by vibrations.

In FIG. 1, installed on the exhaust side of an engine 1 is an exhaust manifold 3 for collecting exhaust pipes for exhaust gas from the engine. Because the engine 1 and the exhaust manifold 3 emit physical energies such as sound and heat to the outside, a shielding body 2 for containing the physical energy is attached to the engine 1 and the exhaust manifold 3.

The shielding body 2 is usually made from a metal sheet, and fixed to a predetermined position of the engine 1 or the exhaust manifold 3 with a fixing bolt 4. The connector according to the present invention is provided to a position where the shielding body 2 is fixed to the engine 1 or the exhaust manifold 3 with the fixing bolt 4, that is, to a connection between a vibrating body and a shielding body, to prevent vibrations of the engine 1 or the exhaust manifold 3 from being transmitted to the shielding body 2. In other words, the connector according to the present invention is a connecting structure for connecting a vibrating body and a plate-like shielding body. As illustrated in FIG. 2, the shielding body 2 is fixed to the connector 5, and the connector 5 with the shielding body 2 being fixed is attached to the engine 1 or the exhaust manifold 3 that is a vibrating body, with the fixing bolt 4 that is a fixing member.

As illustrated in FIG. 3, the connector 5 is manufactured using a first collar part member 11, the coupling member 120 on which no holder section has been formed, a first buffer member 13 including a spiral-shaped wire in a plan view, a second buffer member 14 made from a substantially annular and flat plate-like metallic mesh material or spring steel material, and a second collar part member 15.

In the connector 5 illustrated in FIG. 2, as buffer members, the first buffer member 13 including a spiral-shaped wire in a plan view, and the second buffer member 14 made from a substantially annular and flat plate-like metallic mesh material or spring steel material are interposed between a collar member 20 and a coupling member 12 in the radial direction, in a manner stacked on top of each other.

A cylindrical portion 19 of the collar member 20 is positioned on the inner side of the first buffer member 13 and the second buffer member 14 in the radial direction. In other words, the radially inner sides of the first buffer member 13 and the second buffer member 14 surround the cylindrical portion 19 of the collar member 20. The radially inner sides of the first buffer member 13 and the second buffer member 14 are sandwiched by a first flange 21 and a second flange 22 that face each other in a view in the axial direction.

The collar member 20 is made by assembling the first collar part member 11 and the second collar part member 15 as illustrated in FIG. 4. The first collar part member 11 includes a cylindrical portion 111 of the first collar part member 11, and a projecting portion 21 projecting outwards from an end of the cylindrical portion 111. The second collar part member 15 includes a cylindrical portion 151 of the second collar part member 15, and a projecting portion 22 projecting outwards from an end of the cylindrical portion 151. The collar member 20 is formed by fitting the cylindrical portion 111 of the first collar part member 11 into the inside of the cylindrical portion 151 of the second collar part member 15. In this assembly of the collar member 20, the projecting portion 21 of the first collar part member 11 and the projecting portion 22 of the second collar part member 15 face each other in the axial direction. The projecting portion 21 of the first collar part member 11 serves as the first flange 21 of the collar member 20, and the projecting portion 22 of the second collar part member 15 serves as the second flange 22 of the collar member 20. The cylindrical portion 111 of the first collar part member 11 and the cylindrical portion 151 of the second collar part member 15 serve as the cylindrical portion 19 of the collar member 20, and the inside of the cylindrical portion 19 serves as an insertion hole 17 for a fixing bolt.

The radially outer sides of the first buffer member 13 and the second buffer member 14 are held by the coupling member 12 via a first holder section 124 of the coupling member 12. The first holder section 124 of the coupling member 12 is formed by applying a process for forming the holder section on the coupling member 120 on which no holder section has been formed. As illustrated in FIG. 5(A), the first buffer member 13 and the second buffer member 14 are placed on the inside of the coupling member 120 on which no holder section has been formed, the inside being a side on which the first holder section 124 is to be formed. The entire cylindrical bending end 121 on the side on which the first holder section is to be formed is then bent inwards, so that the radially outer sides of the first buffer member 13 and the second buffer member 14 are sandwiched by a coupling member base portion 123 and the bending end 121. In this manner, the first holder section 124 of the coupling member 12 is formed, and the radially outer sides of the first buffer member 13 and the second buffer member 14 are held by the coupling member 12. The radially outer sides of the first buffer member 13 and the second buffer member 14 are held by the first holder section 124 in such a manner that the first buffer member 13 and the second buffer member 14 do not disengage from the first holder section 124 of the coupling member 12 when a vibration is applied thereto.

The shielding body 2 is held by the coupling member 12 via a second holder section 125 of the coupling member 12. The second holder section 125 of the coupling member 12 is formed by applying a process for forming the holder section to the coupling member 120 on which no holder section has been formed. As illustrated in FIG. 5(B), the shielding body 2 is placed on the outside of the coupling member 120 on which no holder section has been formed, the outside being a side on which the second holder section 125 is to be formed. The entire cylindrical bending end 122 on the side on which the second holder section is to be formed is then bent outwards, so that the radially inner side of the shielding body 2 is sandwiched by the coupling member base portion 123 and the bending end 122. In this manner, the second holder section 125 of the coupling member 12 is formed, and the shielding body 2 is held by the second holder section 125 of the coupling member 12.

As illustrated in FIG. 6, in the connector 5, a gap 16 is formed between the cylindrical portion 19 of the collar member 20 and the radially inner side of the second buffer member 14, in a view from the radial direction. This gap 16 is a gap for allowing the second buffer member 14 to move in the radial direction 23.

In the connector 5, vibrations transmitted from the collar member to the buffer members include a vibrational component in the radial direction 23 and a vibrational component in the axial direction 24. For the vibrational component in the axial direction 24, the first buffer member 13 and the second buffer member 14 both absorb the vibrational component in the axial direction by warping in the axial direction. For the vibrational component in the radial direction 23, as illustrated in FIG. 7, the first buffer member 13 absorbs the vibrational component in the radial direction by elastically deforming repeatedly in such a manner that the space between wire portions narrows and widens. With such a configuration, the connector 5 buffers the vibrations transmitted from the collar member, and isolates the shielding body 2 from the vibrations. At this time, the radially outer side of the second buffer member 14, together with the radially outer side of the first buffer member 13, is held by the first holder section 124 of the coupling member 12, and the radially inner side of the second buffer member 14 is sandwiched by the first flange 21 and the second flange 22 in a manner that the second buffer member is movable in the radial direction. Therefore, when the first buffer member 13 elastically deforms repeatedly in such a manner that the space between the wire portions narrows and widens by receiving the vibrations from the collar member, the second buffer member 14 moves repeatedly in the radial direction, with the radially inner side thereof moving closer to and away from the cylindrical portion 19 of the collar member 20. Such repetitive movement of the second buffer member 14 in the radial direction is possible by the presence of the gap 16 between the cylindrical portion 19 of the collar member 20 and the radially inner side of the second buffer member 14 in the radial direction.

In the connector 5, the radially inner sides of the first buffer member 13 and the second buffer member 14 are sandwiched by the first flange 21 and the second flange 22 of the collar member 20 to a degree allowing the second buffer member 14 to move in the radial direction, with the radially inner side thereof moving closer to and away from the cylindrical portion 19 of the collar member 20, by the vibrational component in the radial direction. If the force by which the radially inner sides of the first buffer member 13 and the second buffer member 14 are sandwiched by the first flange 21 and the second flange 22 of the collar member 20 is too large, the first buffer member 13 cannot deform elastically in the radial direction, or the second buffer member 14 cannot move in the radial direction. The radially inner sides of the first buffer member 13 and the second buffer member 14 may have a gap towards the first flange 21 and the second flange 22 to a degree allowing the first buffer member 13 to elastically deform in the radial direction, and allowing the second buffer member 14 to move in the radial direction. If the gap is too large, however, the radially inner sides of the first buffer member 13 and the second buffer member 14 disengages from the first flange 21 and the second flange 22.

Furthermore, in the connector 5, the size of the gap 16 in the radial direction is adjusted in such a manner that, when the second buffer member 14 moves repeatedly in the radial direction, the radially inner side of the second buffer member 14 does not disengage from the first flange 21 and the second flange 22 of the collar member 20. In other words, in the connector 5, the inner diameter of the second buffer member 14, the outer diameter of the cylindrical portion 19 of the collar member 20, and the lengths by which the first flange 21 and the second flange 22 protrude are adjusted so that the radially inner side of the second buffer member 14 does not disengage from the first flange 21 and the second flange 22 of the collar member 20.

In this manner, in the connector 5, the buffer members buffer the vibrations transmitted from the collar member 20. As illustrated in FIGS. 6 and 7, because the flat plate-like second buffer member 14 is present on one side of the first buffer member 13, and middle portions 131a, 131b of the wire of the first buffer member 13 slide along the one side of the second buffer member 14 by receiving a vibration, it is possible to prevent the middle portions 131a, 131b of the wire of the first buffer member 13 from coming out in the axial direction 24.

Furthermore, as illustrated in FIGS. 6 and 7, there is the gap 16 between the flat plate-like second buffer member 14 and the cylindrical portion 19 of the collar member 20, and the first buffer member 13 including a spiral-shaped wire is configured to elastically deform to receive the second buffer member 14 moving towards the cylindrical portion 19 of the collar member 20 by receiving a vibration. Therefore, the radially inner side of the second buffer member 14 is prevented from colliding strongly with the cylindrical portion 19 of the collar member 20. Based on the above, it is possible to prevent the vibrations from the collar member from generating "rattling sound" due to the radially inner side of the second buffer member 14 colliding strongly with the cylindrical portion 19 of the collar member 20 repeatedly.

A connector according to a first embodiment of the present invention is a connector provided to a connection between a vibrating body that is a vibration source and a plate-like shielding body that is attached to the vibrating body, the connector including:

a first buffer member that includes a spiral-shaped wire in a plan view;

a second buffer member that has a substantially annular and flat plate-like shape, that is capable of warping in a thickness direction, and that is stacked with the first buffer member;

a collar member that includes a cylindrical portion having an insertion hole for a fixing member for attaching the connector to the vibrating body, the cylindrical portion surrounded by the first buffer member and the second buffer member, a first flange facing a radially inner side of the first buffer member, and a second flange facing a radially inner side of the second buffer member, the first and the second flanges both protruding from the cylindrical portion in a radial direction; and a coupling member that includes a first holder section holding radially outer sides of the first buffer member and the second buffer member, a second holder section holding the shielding body, and a coupling member base portion connecting the first holder section and the second holder section, in which a gap for allowing the second buffer member to move in the radial direction is formed between the second buffer member and the cylindrical portion, and the radially inner sides of the first buffer member and the second buffer member are sandwiched by the first flange and the second flange in such a manner that the second buffer member is movable in the radial direction.

The connector according to the first embodiment of the present invention is a connector that is provided to a connection between the vibrating body that is a vibration source, and a plate-like shielding body that is attached to the vibrating body. In other words, the connector is a connecting structure for connecting a vibrating body and a shielding body. Examples of the vibrating body that is a vibration source include an engine, a transmission, an exhaust manifold attached to an engine, a turbocharger, a heat-exchanging part, and an electrical rotating machine. The shielding body attached to the vibrating body is a part for preventing physical energies such as heat and sound emitted from the vibration source or parts near the vibration source, from being transmitted to the other parts around the engine or to the outside of the vehicle. The shielding body usually includes two metal sheets facing each other. The shielding body may include two metal sheets or may be applied with a damping material or a sound absorbing material depending on the need for thermal insulation or sound insulation. A fixing member, such as a fixing bolt, is inserted into the insertion hole for a fixing member provided to the connector according to the present invention with which the shielding body is held, and the connector according to the present invention with which the shielding body is held is fixed to the vibrating body by the fixing member to attach the shielding body to the vibrating body.

The connector according to the first embodiment of the present invention includes a first buffer member including a spiral-shaped wire in a plan view, a second buffer member that has a substantially annular and flat plate-like shape, and that is capable of warping in the thickness direction, a collar member, and a coupling member.

The first buffer member includes a spiral-shaped wire in a plan view. For the spiral shape of the first buffer member, the wire is wound at substantially the same position in a view in the axial direction. Therefore, the shape of the winding of the first buffer member is not what is called a helical spiral-shape in which the wound position gradually changes as the spiral travels further towards the outside. However, every spiral part of the first buffer member does not need to be wound at completely the same position in the axial direction, and there may be some parts that are somewhat offset in the axial direction, within a range not impairing the effects of the present invention. The spiral of the first buffer member may be wound in either the clockwise or the counter clockwise direction. The curvature radius of the spiral of the first buffer member may change at a constant change ratio from the radially inner side to the radially outer side, or there may be some part that the curvature radius changes at a different ratio from the radially inner side to the radially outer side. Intervals between the adjacent wire portions of the first buffer member in the radial direction may be all constant, or some intervals between the adjacent wire portions of the first buffer member in the radial direction may be different.

Examples of the material of the wire of the first buffer member include a hard steel wire, a stainless-steel wire, a piano wire, and a spring steel material. The stainless-steel wire is preferable from the viewpoint of improved heat resistance, vibration proof properties, and corrosion resistance. Examples of the cross-sectional shape of the wire of the first buffer member include a circle, an ellipse, and a rectangle. The thickness of the wire of the first buffer member is not limited to a particular size, but is preferably 0.8 to 1.2 mm.

Figure 8A:
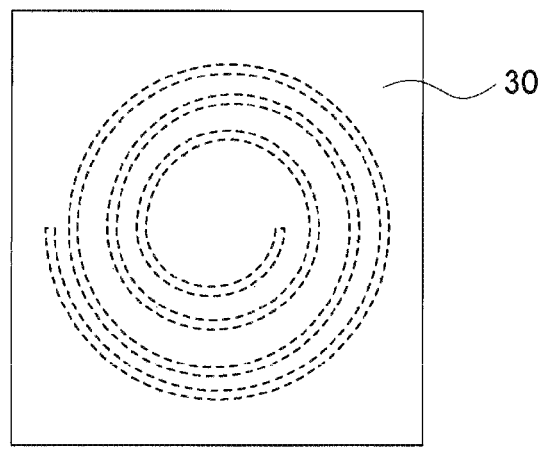
FIGS. 8(A)-8(B) are schematics illustrating how a first buffer member is manufactured by punching a metal sheet.
Figure 8A:
Figure 8B:
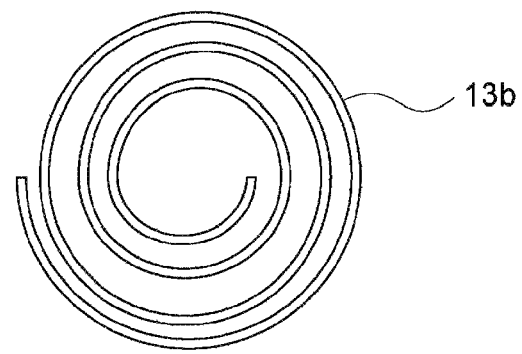

A method for manufacturing the first buffer member is not limited to a particular method, and examples thereof include a method for forming one long wire into a predetermined spiral shape, and a method for punching a metal sheet 30 along the line indicated by the dotted line illustrated in FIG. 8(A), and forming a first buffer member 13b as the spiral-shaped body formed by punching the metal sheet as illustrated in FIG. 8(B). The method illustrated in FIG. 8 in which a spiral-shaped first buffer member is formed by punching a metal sheet is preferable, from the viewpoint that the method can achieve a shape in which every spiral part of the first buffer member is wound at the same position in the axial direction more easily, and the spiral shape can be formed more easily, compared with the method for forming a wire into a spiral shape.

The second buffer member has a substantially annular and flat plate-like shape. The second buffer member is capable of warping in the thickness direction. The material and the thickness of the second buffer member are not limited to particular material or thickness as long as the second buffer member is capable of warping in the thickness direction.

Figure 12A:
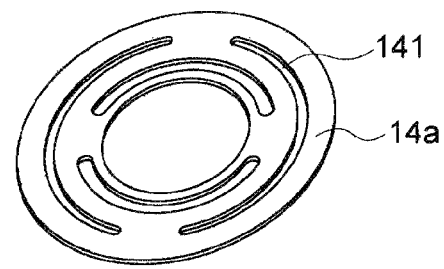
FIGS. 12(A) 12(B) are schematics illustrating an exemplary embodiment of a second buffer member.
Figure 12B:
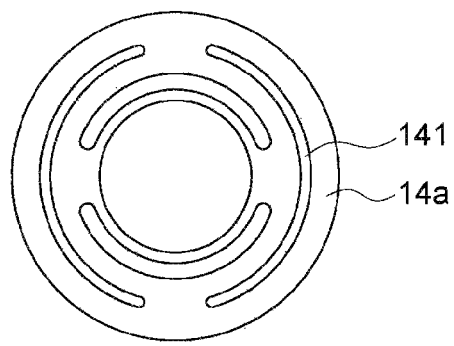

Examples of the material of the second buffer member include a metallic mesh material, a metal sheet material such as a spring steel material, and an inorganic fiber material applied with molding or felt working. A metal sheet material made of a spring steel material is preferable. Furthermore, the thickness of the second buffer member is preferably 0.1 to 2.0. As the second buffer member, it is preferable to use a second buffer member 14a formed by punching a metal sheet material, preferably made of a spring steel material, into a shape having a substantially annular contour and provided with substantially arch-shaped long holes 141, as illustrated as an exemplary embodiment in FIG. 12.

In the connector according to the first embodiment of the present invention, the first buffer member and the second buffer member are stacked, and are interposed between the collar member and the coupling member in the radial direction.

In the connector according to the first embodiment of the present invention, the first buffer member may be positioned on the side of the vibrating body, or the second buffer member may be positioned on the side of the vibrating body. Because the first buffer member is made from a wire, the first buffer member is easily affected by the heat. Therefore, it is preferable that the second buffer member is on the side of the vibrating body so that the first buffer member is less affected by the heat.

In the connector according to the first embodiment of the present invention, the cylindrical portion of the collar member is disposed on the inner side of the first buffer member and the second buffer member in the radial direction, and the radially inner sides of the first buffer member and the second buffer member surround the cylindrical portion of the collar member. Furthermore, the radially inner sides of the first buffer member and the second buffer member are sandwiched by the first flange and the second flange that face each other in a view in the axial direction. In other words, the first flange faces the radially inner side of the first buffer member in the axial direction, and the second flange faces the radially inner side of the second buffer member in the axial direction.

The collar member includes the cylindrical portion, and the first flange and the second flange projecting outwards in the radial direction from respective sides of the cylindrical portion. The collar member also has the insertion hole for the fixing member at the center in the radial direction, that is, on the inner side of the cylindrical portion. In the collar member, the first flange of the collar member and the second flange of the collar member face each other in the axial direction. The radially inner sides of the first buffer member and the second buffer member are sandwiched by the first flange and the second flange that face each other in the axial direction.

Figure 9:
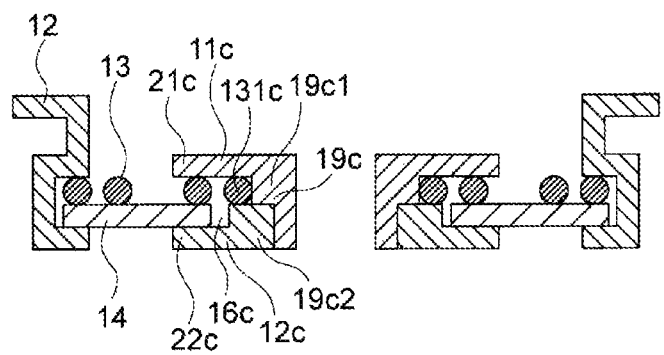
FIG. 9 is an end view schematically illustrating a connector according to another exemplary embodiment of the present invention.

In the collar member in the exemplary embodiment illustrated in FIG. 2, the cylindrical portion is a cylindrical portion having the same outer diameter from the first flange side to the second flange side, in a view in the axial direction. Another embodiment of the cylindrical portion includes a cylindrical portion 19c in which a cylindrical portion 19c1 on the side of a first flange 21c has a smaller outer diameter, and a cylindrical portion 19c2 on the side of a second flange 22c has a larger outer diameter, in a view in the axial direction, such as a collar member according to the exemplary embodiment illustrated in FIG. 9. In the exemplary embodiment illustrated in FIG. 9, a holder section for a radially innermost wire portion 131c of the first buffer member 13 is formed by the first flange 21c, the radially outer side of the cylindrical portion 19c1 having a smaller outer diameter on the side of the first flange, and a surface of the cylindrical portion 19c2 having a larger outer diameter on the side of the second flange, the surface facing the first flange 21c. The radially innermost wire portion 131c of the first buffer member 13 is held by this holder section. For example, the radially innermost wire portion 131c of the first buffer member 13 is sandwiched firmly between the first flange 21c, and the surface of the cylindrical portion 19c2 having a larger outer diameter on the side of the second flange, the surface facing the first flange 21c. In the exemplary embodiment illustrated in FIG. 9, a gap 16c is formed between the radially inner side of the second buffer member 14 and the cylindrical portion 19c2 having a larger diameter on the side of the second flange. Furthermore, in the exemplary embodiment illustrated in FIG. 9, the radially inner sides of the first buffer member 13 and the second buffer member 14 are sandwiched by the first flange 21c and the second flange 22c of the collar member in such a manner that the second buffer member 14 is movable in the radial direction by receiving a vibration in the radial direction.

The coupling member includes the first holder section for holding the radially outer sides of the first buffer member and the second buffer member, a second holder section for holding the shielding body, and a coupling member base portion for connecting the first holder section and the second holder section.

The radially outer sides of the first buffer member and the second buffer member are held by the coupling member via the first holder section of the coupling member. The radially outer sides of the first buffer member and the second buffer member are held by the first holder section of the coupling member so that the radially outer sides do not disengage from the first holder section of the coupling member when vibrations are applied thereto.

The shielding body is held by the coupling member via the second holder section of the coupling member.

Figure 10A:
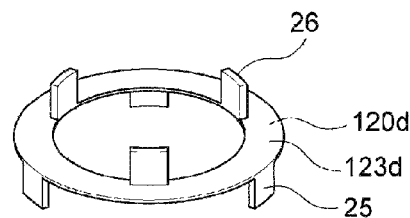
FIGS. 10(A)-10(C) are schematics illustrating another exemplary embodiment of a coupling member on which no holder section has been formed.
Figure 10B:
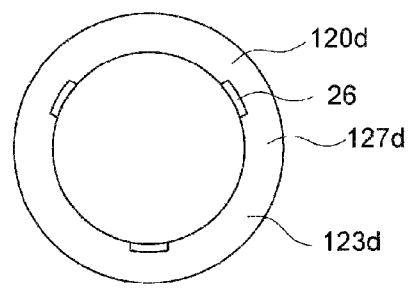
Figure 10C:
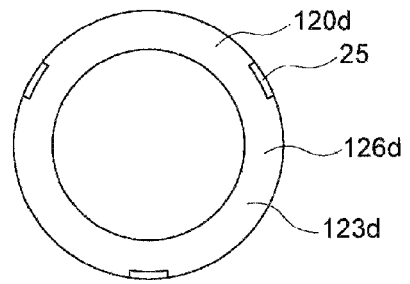

In the exemplary embodiment illustrated in FIG. 2, the first holder section of the coupling member is formed by bending inwards the entire cylindrical bending end on the side on which the first holder section is to be formed, and the second holder section is formed by bending outwards the entire cylindrical bending end on the side on which the second holder section is to be formed. The substantially annular and flat plate-like coupling member base portion is continuous to the first holder section and the second holder section. Another possible embodiment of the coupling member is a coupling member that includes, as in the exemplary embodiment illustrated in FIG. 10, a substantially annular and flat plate-like coupling member base portion 123d, bent portions 25 provided on the radially outer side of the coupling member base portion 123d and bent towards a side of one surface 126d of the coupling member base portion 123d, bent portions 26 provided on the radially inner side of the coupling member base portion 123d and bent towards a side of the other surface 127d of the coupling member base portion 123d. This coupling member is formed by bending the bent portions 25 and 26 provided to a coupling member 120c on which no holder section has been formed. The first holder section of the coupling member is formed by placing the radially outer sides of the first buffer member and the second buffer member on the one surface 126d of the coupling member base portion of the coupling member 120c on which no holder section has been formed in FIG. 10, bending the bent portions 25 inwards, and sandwiching and holding the radially outer sides of the first buffer member and the second buffer member between the one surface 126d of the coupling member base portion and the bent portions 25. Furthermore, the second holder section of the coupling member is formed by placing the shielding body on the other surface 127d of the coupling member base portion of the coupling member 120c on which no holder section has been formed, bending the bent portions 26 outwards, and sandwiching and holding the shielding body between the other surface 127d of the coupling member base portion and the bent portions 26. In the coupling member formed by bending the bent portions of the coupling member 120c on which no holder section has been formed illustrated in FIG. 10, the holder sections are formed at portions provided with the bent portions 25 and 26, and these portions hold the radially outer sides of the first buffer member and the second buffer member and the radially inner side of the shielding body. In the connector according to the first embodiment of the present invention, as long as the radially outer sides of the first buffer member and the second buffer member, and the shielding body are held by the coupling member, the first holder section and the second holder section may be provided to the entire coupling member in the circumferential direction, or may be provided to some parts of the coupling member in the circumferential direction. In other words, the first holder section may hold the entire circumference of the radially outer sides of the first buffer member and the second buffer member, and the second holder section may hold the entire circumference of the radially inner side of the shielding body. Alternatively, the first holder section may hold a part of the entire circumference of the radially outer sides of the first buffer member and the second buffer member, and the second holder section may hold a part of the entire circumference of the radially inner side of the shielding body. In FIG. 10, (A) is a perspective view of the coupling member 120d on which no holder section has been formed, (B) is a bottom view of the coupling member 120d on which no holder section has been formed, and (C) is a top view of the coupling member 120d on which no holder section has been formed.

In the connector according to the first embodiment of the present invention, as to the positions at which the first holder section and the second holder section are formed on the coupling member, in the exemplary embodiment illustrated in FIG. 2, the second holder section of the coupling member is formed at a position further away from the vibrating body in the axial direction, with respect to the first holder section of the coupling member. In other words, the vibrating body, the first holder section, the coupling member base portion, and the second holder section are arranged in this order in the axial direction. However, the present invention is not limited to such an arrangement. As another embodiment, for example, the second holder section of the coupling member may be formed at a position close to the vibrating body in the axial direction, with respect to the first holder section of the coupling member. In other words, the vibrating body, the second holder section, the coupling member base portion, and the first holder section may be arranged in this order in the axial direction. Furthermore, as another embodiment, the second holder section of the coupling member may be formed on the outer side in the radial direction with respect to the first holder section of the coupling member. In other words, the first holder section may be formed on the inner side of the coupling member base portion, and the second holder section may be formed on the outer side of the coupling member base portion, in the radial direction.

In the connector according to the first embodiment of the present invention, a gap is formed between the cylindrical portion of the collar member and the radially inner side of the second buffer member in a view from the radial direction. This gap between the cylindrical portion of the collar member and the radially inner side of the second buffer member is a gap for allowing the second buffer member to move in the in the radial direction by receiving a vibration in the radial direction.

Figure 13A:
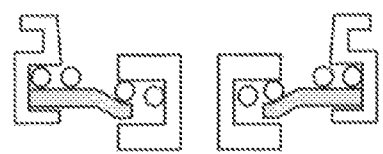
FIGS. 13(A) 13(B) are end views schematically illustrating connectors according to the exemplary embodiments of the present invention.
Figure 13B:
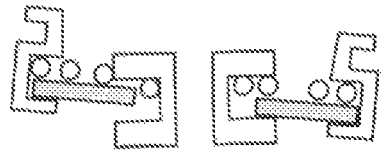

In the connector according to the first embodiment of the present invention, when vibrations are transmitted from the collar member to the buffer member, the first buffer member and the second buffer member buffer the vibrations transmitted from the vibrating body to the collar member, and isolates the shielding body from the vibrations. The vibrations transmitted from the collar member to the buffer members can be divided into a vibrational component in the radial direction and a vibrational component in the axial direction. As to the vibrational component in the axial direction, as illustrated in FIG. 13(A), the first buffer member and the second buffer member both absorb the vibrational component in the axial direction by warping in the axial direction. Furthermore, as to the vibrational component in the radial direction, the first buffer member absorbs the vibrational component in the radial direction by elastically deforming in the radial direction repeatedly in such a manner that the space between the wire portions narrows and widens. In this manner, in the connector according to the first embodiment of the present invention, the shielding body is isolated from the vibrations. At this time, the radially outer side of the second buffer member, together with the radially outer side of the first buffer member, is held by the first holder section of the coupling member, and the radially inner side of the second buffer member is sandwiched by the first flange and the second flange of the collar member in a manner that the second buffer member is movable in the radial direction. Therefore, as the first buffer member elastically deforms repeatedly in such a manner that the space between the wire portions of the first buffer member narrows and widens in the radial direction, the radially inner side of the second buffer member moves in the radial direction repeatedly, with the radially inner side moving closer to and away from the cylindrical portion of the collar member. Such repetitive movement of the second buffer member in the radial direction is possible by the presence of the gap between the cylindrical portion of the collar member and the radially inner side of the second buffer member in the radial direction. The actual vibration is a resultant force of vibrational components in the axial direction and the radial direction that are oriented differently. Therefore, in practice, the wire of the first buffer member elastically deforms in the radial direction, the second buffer member moves repeatedly in the radial direction, and the first buffer member and the second buffer member warp in the axial direction, simultaneously in a complex manner. Furthermore, in an embodiment in which the gap between the second buffer member and the cylindrical portion is larger than the width of the radially innermost wire portion of the first buffer member, when the vibration transmitted from the collar member to the buffer member is small, as illustrated in FIG. 13(B), the radially inner side of the second buffer member enters the space between the radially innermost wire portion of the first buffer member and the radially second innermost wire portion of the first buffer member, and the second buffer member tilts, bringing the radially second innermost wire portion of the first buffer member outside the first flange, thereby deforming the first buffer member. In this manner, the first buffer member absorbs the vibrational component in the axial direction. As to the vibrational component in the radial direction, the first buffer member absorbs the vibrational component in the radial direction by elastically deforming in the radial direction repeatedly in such a manner that space between the wire portions of the first buffer member narrows and widens. In other words, in the embodiment in which the gap between the second buffer member and the cylindrical portion is larger than the width of the radially innermost wire portion of the first buffer member, when the vibration transmitted from the collar member to the buffer member is small, the second buffer member hardly deforms, and the first buffer member mostly deforms to isolate the shielding body from the vibration. In the embodiment in which the gap between the second buffer member and the cylindrical portion is larger than the width of the radially innermost wire portion of the first buffer member, when the vibration transmitted from the collar member to the buffer member is large, as to the vibrational component in the axial direction, the first buffer member and the second buffer member both absorb the vibrational component in the axial direction by warping in the axial direction, as illustrated in FIG. 13(A). As to the vibrational component in the radial direction, the first buffer member absorbs the vibrational component in the radial direction by elastically deforming in the radial direction repeatedly in such a manner that the space between the wire portions of the first buffer member narrows and widens. In this manner, the shielding body is isolated from the vibrations.

In the connector according to the first embodiment of the present invention, the radially inner sides of the first buffer member and the second buffer member are sandwiched by the first flange and the second flange of the collar member in such a manner that the second buffer member is movable repeatedly in the radial direction, with the radially inner side of the second buffer member moving closer to and away from the cylindrical portion of the collar member, by receiving a vibration in the radial direction. If the radially inner sides of the first buffer member and the second buffer member are sandwiched by the first flange and the second flange of the collar member with a large force, the wire of the first buffer member cannot deform elastically in the radial direction, or the second buffer member cannot move repeatedly in the radial direction. By contrast, if the radially inner sides of the first buffer member and the second buffer member have a too large gap towards the first flange and the second flange of the collar member, the radially inner side of the second buffer member may disengage from the first flange and the second flange by receiving a vibration. Therefore, in the connector according to the first embodiment of the present invention, the radially inner sides of the first buffer member and the second buffer member are sandwiched by the first flange and the second flange of the collar member, with a small gap to a degree allowing the wire of the first buffer member to elastically deform in the radial direction, and the second buffer member to move repeatedly in the radial direction. Alternatively, the radially inner sides of the first buffer member and the second buffer member are sandwiched by the first flange and the second flange of the collar member, with the radially inner sides kept in contact with the first flange and the second flange of the collar member, respectively, to a degree allowing the wire of the first buffer member to elastically deform in the radial direction, and the second buffer member to move repeatedly in the radial direction.

In the connector according to the first embodiment of the present invention, if the difference between the inner diameter of the first buffer member and the outer diameter of the cylindrical portion of the collar member is equal to or larger than the gap between the radially inner side of the second buffer member and the cylindrical portion of the collar member, when a vibration in the radial direction is received, the radially inner side of the second buffer member, moving in the radial direction, collides with the cylindrical portion of the collar member before the first buffer member deforms elastically in the radial direction. Therefore, the effects and the advantages of the present invention cannot be achieved. Hence, in the connector according to the present invention, the radially innermost portion of the first buffer member is kept in contact with the cylindrical portion of the collar member, or the radially innermost portion of the first buffer member has a gap towards the cylindrical portion of the collar member within a range in which the difference between the inner diameter of the first buffer member and the outer diameter of the cylindrical portion of the collar member is smaller than the gap between the radially inner side of the second buffer member and the cylindrical portion of the collar member, and within a range in which the effects and the advantages of the present invention are achieved.

In the connector according to the first embodiment of the present invention, the size of the gap between the radially inner side of the second buffer member and the cylindrical portion of the collar member is adjusted so that the radially inner side of the second buffer member does not disengage from the first flange and the second flange of the collar member. In other words, in the connector according to the present invention, the inner diameter of the second buffer member, the outer diameter of the cylindrical portion of the collar member, and the lengths by which the first flange and the second flange protrude in the radial direction are adjusted in such a manner that the radially inner side of the second buffer member does not disengage from the first flange and the second flange of the collar member.

In this manner, the connector according to the first embodiment of the present invention buffers the vibrations transmitted from the collar member to the buffer member. The flat plate-like second buffer member is placed on the side of one surface of the first buffer member, and a middle portion of the wire of the first buffer member slides along the one surface of the second buffer member when vibrations are applied thereto. Therefore, the middle portion of the wire of the first buffer member is prevented from coming out in the axial direction.

Furthermore, in the connector according to the first embodiment of the present invention, there is the gap between the flat plate-like second buffer member and the cylindrical portion of the collar member, and the first buffer member including a spiral-shaped wire elastically deforms to receive the second buffer member moving towards the cylindrical portion of the collar member when vibrations are received. Therefore, it is possible to prevent the radially inner side of the second buffer member from colliding strongly with the cylindrical portion of the collar member. Based on the above, it is possible to prevent the vibrations from the collar member from generating "rattling sound" due to the radially inner side of the second buffer member colliding strongly with the cylindrical portion of the collar member repeatedly.

A connector according to a second embodiment of the present invention is a connector provided to a connection between a vibrating body that is a vibration source and a plate-like shielding body that is attached to the vibrating body, the connector including:

a first buffer member that includes a spiral-shaped wire in a plan view;

a second buffer member that has a substantially annular and flat plate-like shape, that is capable of warping in a thickness direction, and that is stacked with the first buffer member;

a third buffer member that includes a spiral-shaped wire in a plan view, and that is stacked with the second buffer member on a side opposite to the first buffer member;

a collar member that includes a cylindrical portion having an insertion hole for a fixing member for attaching the connector to the vibrating body, the cylindrical portion surrounded by the first buffer member, the second buffer member, and the third buffer member, a first flange facing a radially inner side of the first buffer member, and a second flange facing a radially inner side of the third buffer member, the first and the second flanges both protruding in a radial direction; and a coupling member that includes a first holder section that holds radially outer sides of the first buffer member, the second buffer member, and the third buffer member, a second holder section holding the shielding body, and a coupling member base portion connecting the first holder section and the second holder section, in which a gap for allowing the second buffer member to move in the radial direction is formed between the second buffer member and the cylindrical portion, and the radially inner sides of the first buffer member, the second buffer member, and the third buffer member are sandwiched by the first flange and the second flange in a manner that the second buffer member is movable in the radial direction.

The connector according to the second embodiment of the present invention is different from the connector according to the first embodiment of the present invention in that the connector according to the second embodiment of the present invention further includes the third buffer member that is stacked with the second buffer member. Other elements of the connector according to the second embodiment of the present invention are the same as those in the connector according to the first embodiment of the present invention. Therefore, in the explanation hereunder, the difference of the connector according to the second embodiment of the present invention from the connector according to the first embodiment of the present invention will be explained, and the explanations of the same points will be omitted.

Figure 11:
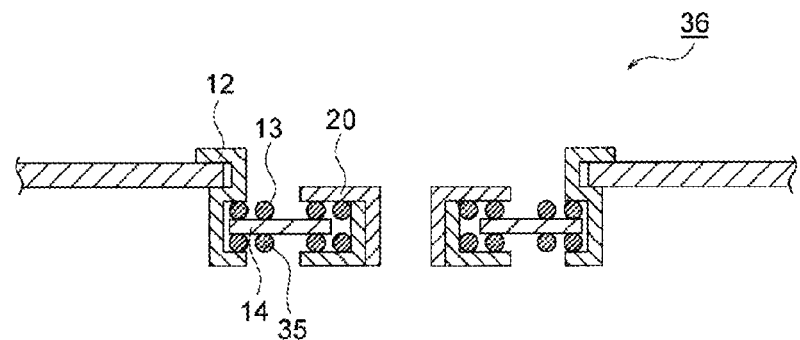
FIG. 11 is an end view schematically illustrating a connector according to an exemplary embodiment of the present invention.

The connector according to the second embodiment of the present invention includes the first buffer member including a spiral-shaped wire in a plan view, the second buffer member that has a substantially annular and flat plate-like shape, and that is capable of warping in the thickness direction, a third buffer member that includes a spiral-shaped wire in the plan view, a collar member, and a coupling member. For example, as illustrated in FIG. 11, this connector 36 includes the first buffer member 13 that includes a spiral-shaped wire in a plan view, the second buffer member 14 that has a substantially annular and flat plate-like shape, and is capable of warping in the thickness direction, a third buffer member 35 that includes a spiral-shaped wire in the plan view, the collar member 20, and the coupling member 12. In the connector 36, the third buffer member 35, the second buffer member 14, and the first buffer member 13 are stacked in this order from the side of the vibrating body.

The first buffer member and the second buffer member in the connector according to the second embodiment of the present invention are the same as those in the connector according to the first embodiment of the present invention.

The third buffer member is the same as the first buffer member except that the third buffer member is stacked with the second buffer member on the opposite side of the first buffer member.

In the connector according to the second embodiment of the present invention, the first buffer member, the second buffer member, and the third buffer member are stacked in this order, and are interposed between the collar member and the coupling member in the radial direction.

In the connector according to the second embodiment of the present invention, it is possible to design the first buffer member and the third buffer member to have different materials, wire diameters, cross-sectional shapes, numbers of winding, circumferential lengths, or other properties from each other so that the first buffer member and the third buffer member mainly absorb vibrations in different frequency bands. In this manner, vibrations in frequency bands in which vibrations frequently occur can be efficiently isolated.

In the connector according to the second embodiment of the present invention, the cylindrical portion of the collar member is disposed on the inner side of the first buffer member, the second buffer member, and the third buffer member in the radial direction, and the radially inner sides the first buffer member, the second buffer member, and the third buffer member surround the cylindrical portion of the collar member. Furthermore, the radially inner sides of the first buffer member, the second buffer member, and the third buffer member are sandwiched by the first flange and the second flange that face each other in a view in the axial direction. In other words, the first flange faces the radially inner side of the first buffer member in the axial direction, and the second flange faces the radially inner side of the third buffer member in the axial direction.

The collar member and the coupling member in the connector according to the second embodiment of the present invention are the same as those in the connector according to the first embodiment of the present invention except that the buffer members in the connector according to the second embodiment of the present invention include the first buffer member, the second buffer member, and the third buffer member.

In the connector according to the second embodiment of the present invention, a gap is formed between the cylindrical portion of the collar member and the radially inner side of the second buffer member, in a view from the radial direction. This gap between the cylindrical portion of the collar member and the radially inner side of the second buffer member is a gap for allowing the second buffer member to move in the radial direction by receiving a vibration in the radial direction.

In the connector according to the second embodiment of the present invention, the first buffer member, the second buffer member, and the third buffer member buffer the vibrations transmitted from the vibrating body to the collar member, upon being transmitted from the collar member to the buffer member. Therefore, the shielding body is isolated from the vibrations. As to the vibrational component in the axial direction, the first buffer member, the second buffer member, and the third buffer member all absorb the vibrational component in the axial direction by warping in the axial direction. As to the vibrational component in the radial direction, the first buffer member and the third buffer member absorb the vibrational component in the radial direction by elastically deforming in the radial direction repeatedly in such a manner that the space between the wire portions of the first buffer member and the third buffer member narrows and widens. In this manner, the connector according to the second embodiment of the present invention isolates the shielding body from the vibrations. At this time, the radially outer side of the second buffer member, together with the radially outer sides the first buffer member and the third buffer member, is held by the first holder section of the coupling member, and the radially inner side of the second buffer member is sandwiched by the first flange and the second flange of the collar member in a manner that the second buffer member is movable in the radial direction. Therefore, as the first buffer member and the third buffer member elastically deform repeatedly in such a manner that the space between the wire portions narrows and widens in the radial direction, the radially inner side of the second buffer member moves in the radial direction repeatedly, with the radially inner side moving closer to and away from the cylindrical portion of the collar member. Such repetitive movement of the second buffer member in the radial direction is possible by the presence of the gap between the cylindrical portion of the collar member and the radially inner side of the second buffer member in the radial direction. The actual vibration is a resultant force of vibrational components in the axial direction and the radial direction that are oriented differently. Therefore, in practice, the wires of the first buffer member and the third buffer member elastically deform in the radial direction, the second buffer member moves repeatedly in the radial direction, and the first buffer member, the second buffer member, and the third buffer member warp in the axial direction, simultaneously in a complex manner.

In the connector according to the second embodiment of the present invention, the radially inner sides the first buffer member, the second buffer member, and the third buffer member are sandwiched by the first flange and the second flange of the collar member in such a manner that the second buffer member is movable repeatedly in the radial direction, with the radially inner side of the second buffer member moving closer to and away from the cylindrical portion of the collar member, by receiving a vibration in the radial direction. If the radially inner sides of the first buffer member, the second buffer member, and the third buffer member are sandwiched by the first flange and the second flange of the collar member with a large force, the wires of the first buffer member and the third buffer member cannot deform elastically in the radial direction, or the second buffer member cannot move repeatedly in the radial direction. By contrast, if the radially inner sides the first buffer member, the second buffer member, and the third buffer member have a too large gap towards the first flange and the second flange of the collar member, the radially inner sides of the first buffer member, the second buffer member, and the third buffer member may disengage from the first flange and the second flange by receiving a vibration. Therefore, in the connector according to the second embodiment of the present invention, the radially inner sides of the first buffer member, the second buffer member, and the third buffer member are sandwiched by the first flange and the second flange of the collar member, with a small gap to a degree allowing the wires of the first buffer member and the third buffer member to elastically deform in the radial direction, and the second buffer member to move repeatedly in the radial direction. Alternatively, the radially inner sides of the first buffer member, the second buffer member, and the third buffer member are sandwiched by the first flange and the second flange of the collar member, with the radially inner sides of the first buffer member and the third buffer member kept in contact with the first flange and the second flange of the collar member, respectively, to a degree allowing the wires of the first buffer member and the third buffer member to elastically deform in the radial direction, and the second buffer member to move repeatedly in the radial direction.

In the connector according to the second embodiment of the present invention, if the difference between the inner diameter of the first buffer member and the third buffer member, and the outer diameter of the cylindrical portion of the collar member is equal to or larger than the gap between the radially inner side of the second buffer member and the cylindrical portion of the collar member, when a vibration in the radial direction is received, the radially inner side of the second buffer member, moving in the radial direction, collides with the cylindrical portion of the collar member, before the first buffer member and the third buffer member elastically deform in the radial direction. Therefore, the effects and the advantages of the present invention cannot be achieved. Hence, in the connector according to the second embodiment of the present invention, the radially innermost portions of the first buffer member and the third buffer member are kept in contact with the cylindrical portion of the collar member, or the radially innermost portions of the first buffer member and the third buffer member have a gap towards the cylindrical portion of the collar member within a range in which the difference between the inner diameters of the first buffer member and the third buffer member and the outer diameter of the cylindrical portion of the collar member is smaller than the gap between the radially inner side of the second buffer member and the cylindrical portion of the collar member, and within a range in which the effects and the advantages of the present invention are achieved.

In the connector according to the second embodiment of the present invention, the size of the gap between the radially inner side of the second buffer member and the cylindrical portion of the collar member is adjusted so that the radially inner side of the second buffer member does not disengage from the first flange and the second flange of the collar member. In other words, in the connector according to the second embodiment of the present invention, the inner diameter of the second buffer member, the outer diameter of the cylindrical portion of the collar member, and the lengths by which the first flange and the second flange protrude in the radial direction are adjusted in such a manner that the radially inner side of the second buffer member does not disengage from the first flange and the second flange of the collar member.

In this manner, in the connector according to the second embodiment of the present invention buffers the vibrations transmitted from the collar member to the buffer member. The flat plate-like second buffer member is placed on the side of one surface of the first buffer member, and middle portions of the wires of the first buffer member and the third buffer member slide along the one surface of the second buffer member when vibrations are applied thereto. Therefore, the middle portions of the wires of the first buffer member and the third buffer member are prevented from coming out in the axial direction. Furthermore, in the connector according to the second embodiment of the present invention, because the second buffer member is interposed between the first buffer member and the third buffer member, it is possible to prevent the middle portions of the wire of the first buffer member and the wire of the third buffer member from becoming entangled with each other when vibrations are applied thereto.

Furthermore, in the connector according to the second embodiment of the present invention, there is the gap between the flat plate-like second buffer member and the cylindrical portion of the collar member, and the first buffer member and the third buffer member each including a spiral-shaped wire elastically deform to receive the second buffer member moving towards the cylindrical portion of the collar member when vibrations are received. Therefore, it is possible to prevent the radially inner side of the second buffer member from colliding strongly with the cylindrical portion of the collar member. Based on the above, it is possible to prevent the vibrations from the collar member from generating "rattling sound" due to the radially inner side of the second buffer member colliding strongly with the cylindrical portion of the collar member repeatedly.

LIST OF REFERENCE SIGNS 1 engine
2 shielding body
3 exhaust manifold
4 fixing screw
5, 36 connector
11, 11c first collar part member
12, 12c, 12d coupling member
13, 13b first buffer member
14, 14a second buffer member
15 second collar part member
16, 16c gap between radially inner side of second buffer member and cylindrical portion of collar member
17 insertion hole
19 cylindrical portion of collar member
19c1 cylindrical portion on side of first flange
19c2 cylindrical portion on side of second flange
20 collar member
21, 21c first flange
22, 22c second flange
23 radial direction
24 axial direction
25, 26 bent portion
30 metal sheet
35 third buffer member
111 cylindrical portion of first collar part member
120 coupling member on which no holder section has been formed
121 bending end on side where first holder section is to be formed
122 bending end on side on which second holder section is to be formed
123, 123d coupling member base portion
124 first holder section
125 second holder section
126d one surface of coupling member base portion
127d another surface of coupling member base portion
131a, 131b middle portion of wire of first buffer member
131c radially innermost portion of first buffer member
141 long hole portion
151 cylindrical portion of second collar part member

The invention claimed is:

1. A connector provided to a connection between a vibrating body that is a vibration source, and a plate-shaped shielding body that is attached to the vibrating body, the connector comprising:
a first buffer member that includes a spiral-shaped wire in a plan view;
a second buffer member that is substantially annular and flat plate-shaped, that is capable of warping in a thickness direction, and that is stacked with the first buffer member;
a collar member that includes a cylindrical portion having an insertion hole for a fixing member for attaching the connector to the vibrating body, the cylindrical portion surrounded by the first buffer member and the second buffer member and extending through annular apertures thereof, a first flange facing a radially inner side of the first buffer member, and a second flange facing a radially inner side of the second buffer member, the first and the second flanges both protruding from the cylindrical portion in a radial direction and clamping the first and second buffer members therebetween; and
a coupling member that includes a first holder section holding radially outer sides of the first buffer member and the second buffer member and clamping the first and second buffer members therein, a second holder section holding the shielding body, and a coupling member base portion connecting the first holder section and the second holder section,
wherein:
a gap for allowing the second buffer member to move in the radial direction is formed between the second buffer member and the cylindrical portion, and the radially inner sides of the first buffer member and the second buffer member are sandwiched by the first flange and the second flange in such a manner that the second buffer member is movable in the radial direction and limits axial deformation of the first buffer member.

2. A connector according to claim 1, wherein the second buffer member is made from a substantially annular and flat metallic mesh material or spring steel material.

3. A connector provided to a connection between a vibrating body that is a vibration source, and a plate-shaped shielding body that is attached to the vibrating body, the connector comprising:
a first buffer member that includes a spiral-shaped wire in a plan view;
a second buffer member that is substantially annular and flat plate-shaped, that is capable of warping in a thickness direction, and that is stacked with the first buffer member;
a third buffer member that includes a spiral-shaped wire in a plan view, and that is stacked with the second buffer member on a side opposite to the first buffer member;
a collar member that includes a cylindrical portion having an insertion hole for a fixing member for attaching the connector to the vibrating body, and the cylindrical portion surrounded by the first buffer member, the second buffer member, and the third buffer member and extending through annular apertures thereof, a first flange facing a radially inner side of the first buffer member, and a second flange facing a radially inner side of the third buffer member, the first and the second flanges both protruding in a radial direction and clamping the first, second and third buffer members therebetween; and
a coupling member that includes a first holder section holding radially outer sides of the first buffer member, the second buffer member, and the third buffer member and clamping the first, second and third buffer members therein, a second holder section holding the shielding body, and a coupling member base portion connecting the first holder section and the second holder section,
wherein:
a gap for allowing the second buffer member to move in the radial direction is formed between the second buffer member and the cylindrical portion, and the radially inner sides of the first buffer member, the second buffer member, and the third buffer member are sandwiched by the first flange and the second flange in such a manner that the second buffer member is movable in the radial direction and limits axial deformation of the first and third buffer members.

4. A connector according to claim 3, wherein the second buffer member is made from a substantially annular and flat metallic mesh material or spring steel material.

* * * * *